(12) United States Patent
Marques

(10) Patent No.: US 11,591,253 B2
(45) Date of Patent: Feb. 28, 2023

(54) HIGH REFRACTIVE INDEX SILICATE GLASS COMPOSITIONS WITH REDUCED DEVITRIFICATION KINETICS

(71) Applicant: Corning Incorporated, Corning, NY (US)

(72) Inventor: Paulo Jorge Gaspar Marques, Fontainebleau (FR)

(73) Assignee: CORNING INCORPORATED, Corning, NY (US)

( * ) Notice: Subject to any disclaimer, the term of this patent is extended or adjusted under 35 U.S.C. 154(b) by 502 days.

(21) Appl. No.: 16/676,923

(22) Filed: Nov. 7, 2019

(65) Prior Publication Data

US 2020/0172427 A1 Jun. 4, 2020

Related U.S. Application Data

(60) Provisional application No. 62/772,728, filed on Nov. 29, 2018.

(51) Int. Cl.
  *C03C 3/068* (2006.01)
  *C03B 13/02* (2006.01)
  *C03B 25/02* (2006.01)

(52) U.S. Cl.
  CPC .............. *C03C 3/068* (2013.01); *C03B 13/02* (2013.01); *C03B 25/025* (2013.01)

(58) Field of Classification Search
  CPC ......... C03C 3/064; C03C 3/066; C03C 3/068; C03C 3/095; C03C 25/025; C03B 13/02
  See application file for complete search history.

(56) References Cited

U.S. PATENT DOCUMENTS

| 3,503,764 | A | 3/1970 | Young |
| 3,877,953 | A | 4/1975 | Broemer et al. |
| 3,999,997 | A | 12/1976 | Faulstich et al. |
| 4,057,435 | A | 11/1977 | Boudot et al. |
| 4,084,978 | A | 4/1978 | Sagara |
| 4,213,786 | A | 7/1980 | Faulstich et al. |
| 4,213,787 | A | 7/1980 | Faulstich et al. |
| 4,390,638 | A | 6/1983 | Mennemann et al. |
| 4,400,473 | A | 8/1983 | Mennemann et al. |
| 4,404,290 | A | 9/1983 | Boudot |
| 4,732,876 | A | 3/1988 | Nagamine et al. |
| 4,742,028 | A | 5/1988 | Boudot et al. |
| 9,650,285 | B2 | 5/2017 | Negishi |
| 2008/0254965 | A1 | 10/2008 | Ishioka |

FOREIGN PATENT DOCUMENTS

| EP | 0227269 A1 | 7/1987 |
| GB | 2099417 A | 12/1982 |
| GB | 2265367 A | 9/1993 |

OTHER PUBLICATIONS

International Search Report and Written Opinion of the International Searching Authority; PCT/US2019/061111; dated Feb. 28, 2020; 9 Pages; European Patent Office.

*Primary Examiner* — Elizabeth A. Bolden
(74) *Attorney, Agent, or Firm* — Svetlana Z. Short

(57) ABSTRACT

A glass composition is provided. The glass composition includes: 25-40 wt % $SiO_2$; 2.5-10 wt % $B_2O_3$; 0-10 wt % $Al_2O_3$; 0-15 wt % $Li_2O$; 0-16 wt % of $Li_2O$, $Na_2O$, and $K_2O$ in total; 10-25 wt % CaO; 0-15 wt % BaO; 0-5 wt % MgO; 0-5 wt % SrO; 10-30 wt % CaO, BaO, MgO, and SrO in total; 0-7 wt % ZnO; 2-10 wt % $ZrO_2$; 2-15 wt % $TiO_2$; 5-25 wt % $Nb_2O_5$; 0-5 wt % $Ta_2O_5$; 5-25 $La_2O_3$; and 0-5 wt % $Y_2O_3$. The glass composition has a refractive index from about 1.74 to about 1.80, a density from about 3.5 g/cm$^3$ to about 4.0 g/cm$^3$, a critical cooling rate from about 1° C./min to about 50° C./min, and a liquidus viscosity greater than 25 Poises.

14 Claims, 2 Drawing Sheets

HIG 31 glass cooled at 5°C/min from 1150°C down to 600°C

HIG 31 glass cooled at 10°C/min from 1150°C down to 600°C

HIG 31 glass cooled at 30°C/min from 1150°C down to 600°C

HIGH REFRACTIVE INDEX SILICATE GLASS COMPOSITIONS WITH REDUCED DEVITRIFICATION KINETICS

This application claims the benefit of priority to U.S. Provisional Application Ser. No. 62/772,728 filed on Nov. 29, 2018, the content of which is relied upon and incorporated herein by reference in its entirety.

FIELD OF DISCLOSURE

This invention is related to high refractive index silicate glass compositions, and more particularly, silicate glass compositions having reduced devitrification kinetics.

BACKGROUND

It has long been recognized that glass having a high refractive index ($n_D$) and low density would be especially desirable in many types of optical devices including microscopes, eyewear, displays, virtual reality devices and augmented reality devices requiring high corrections and minimum weight. The low density, very high refractive index glasses presently known exhibit high dispersion or, expressed differently, have a low Abbe number (v), i.e., frequently less than 30, with the consequence of iridescence appearing at the sides of the lenses. In addition, these same high refractive index glasses also exhibit poor thermal stability.

Accordingly, there is a need for improved high refractive index glass compositions that provide improved materials that can translate into improved optical performance, reliability, and manufacturing costs to produce improved optical devices.

SUMMARY

According to some aspects of the present disclosure, a glass composition is provided. The glass composition includes: 25-40 wt % $SiO_2$; 2.5-10 wt % $B_2O_3$; 0-10 wt % $Al_2O_3$; 0-15 wt % $Li_2O$; 0-16 wt % of $Li_2O$, $Na_2O$, and $K_2O$ in total; 10-25 wt % CaO; 0-15 wt % BaO; 0-5 wt % MgO; 0-5 wt % SrO; 10-30 wt % CaO, BaO, MgO, and SrO in total; 0-7 wt % ZnO; 2-10 wt % $ZrO_2$; 2-15 wt % $TiO_2$; 5-25 wt % $Nb_2O_5$; 0-5 wt % $Ta_2O_5$; 5-25 wt % $La_2O_3$; and 0-5 wt % $Y_2O_3$. The glass composition has a refractive index from about 1.74 to about 1.80, a density from about 3.5 g/cm³ to about 4.0 g/cm³, a critical cooling rate from about 1° C./min to about 50° C./min, and a liquidus viscosity greater than 25 Poises.

According to some aspects of the present disclosure, a method of forming a glass is provided. The method includes: providing a mixture of glass components comprising: 25-40 wt % $SiO_2$; 2.5-10 wt % $B_2O_3$; 0-10 wt % $Al_2O_3$; 0-15 wt % $Li_2O$; 10-25 wt % CaO; 0-15 wt % BaO; 0-5 wt % MgO; 0-5 wt % SrO; 0-7 wt % ZnO; 2-10 wt % $ZrO_2$; 2-15 wt % $TiO_2$; 5-25 wt % $Nb_2O_5$; 0-5 wt % $Ta_2O_5$; 5-25 wt % $La_2O_3$; and 0-5 wt % $Y_2O_3$; heating the mixture to a temperature of at least 1,350° C. to form a molten glass; and cooling the melted glass at a critical cooling rate from about 1° C./min to about 50° C./min to form a glass. The glass does not contain any visible crystallites (e.g., stones or crystals) as observed by the naked eye or under an optical microscope and has a refractive index from about 1.74 to about 1.80, a density from about 3.5 g/cm³ to about 4.0 g/cm³, a critical cooling rate from about 1° C./min to about 50° C./min, and a liquidus viscosity greater than 25 Poises.

According to other aspects of the present disclosure, a glass composition is provided. The glass composition includes: 25-30 wt % $SiO_2$; 2.5-6 wt % $B_2O_3$; 0-10 wt % $Li_2O$; 15-20 wt % CaO; 0-10 wt % BaO; 10-25 wt % $La_2O_3$; 2-10 wt % $ZrO_2$; 5-20 wt % $Nb_2O_5$; and 2-10 wt % $TiO_2$. The glass composition has a critical cooling rate from about 1° C./min to about 50° C./min and a liquidus viscosity greater than 25 Poises.

Additional features and advantages will be set forth in the detailed description that follows, and in part will be readily apparent to those skilled in the art from that description or recognized by practicing the embodiments as described herein, including the detailed description that follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiments, and together with the description serve to explain principles and operation of the various embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
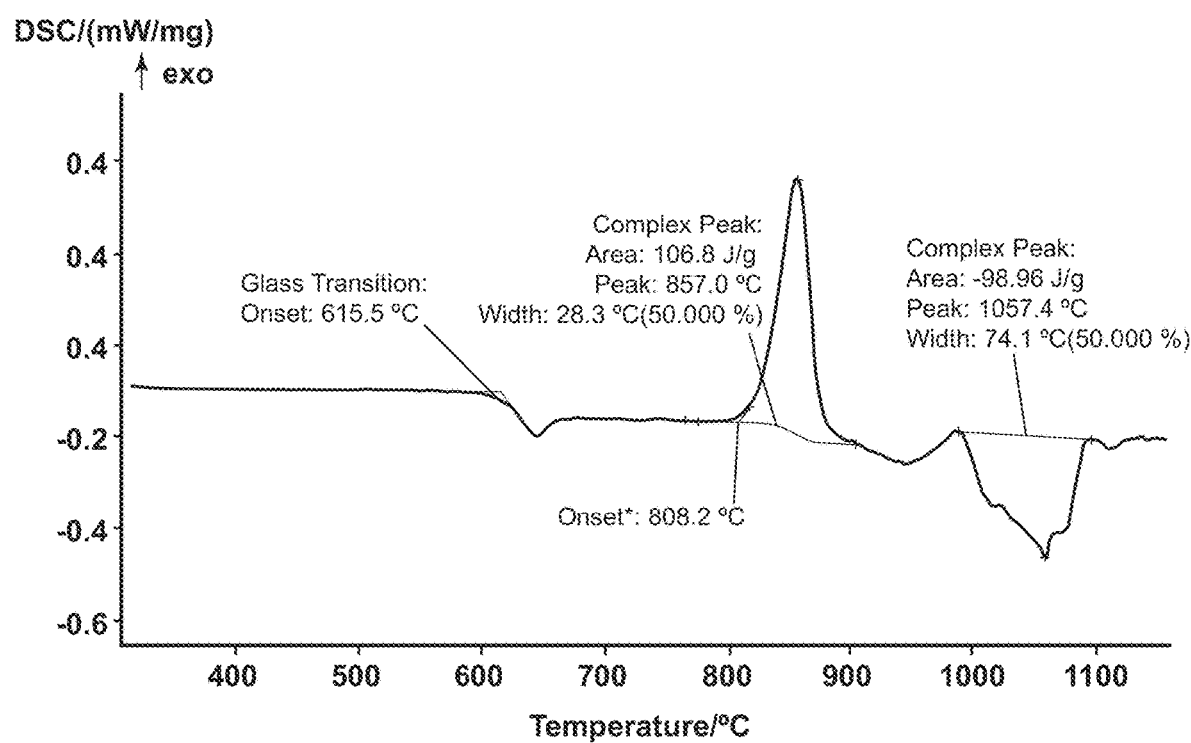
FIG. 1 is a differential scanning calorimetry (DSC) plot of Example 1 at a 10° C./min heating rate according to some aspects of the present disclosure.

Additional features and advantages will be set forth in the detailed description that follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The present disclosure teaches a class of high refractive index silicate glass compositions that can provide high refractive index (>1.75), high transmittance, low density (<3.8 g/cc), high thermal stability, and chemical durability. These provided glasses can be highly transparent, resistant to crystallization, chemically resistant, and highly refractive. The glass composition may include: 25-40 wt % $SiO_2$; 2.5-10 wt % $B_2O_3$; 0-10 wt % $Al_2O_3$; 0-15 wt % $Li_2O$; 0-16 wt % of $Li_2O$, $Na_2O$, and $K_2O$ in total; 10-25 wt % CaO; 0-15 wt % BaO; 0-5 wt % MgO; 0-5 wt % SrO; 10-30 wt % CaO, BaO, MgO, and SrO in total; 0-7 wt % ZnO; 2-10 wt % $ZrO_2$; 2-15 wt % $TiO_2$; 5-25 wt % $Nb_2O_5$; 0-5 wt % $Ta_2O_5$; 5-25 wt % $La_2O_3$; and 0-5 wt % $Y_2O_3$. In various aspects of the present disclosure, the glass composition may include other components that are in the range of about 0 wt % to about 5 wt %. In some aspects, the glass composition has a refractive index from about 1.74 to about 1.80, a density from about 3.5 g/cm$^3$ to about 4.0 g/cm$^3$, a critical cooling rate from about 1° C./min to about 50° C./min, and a liquidus viscosity greater than 25 Poises (P). In various examples, the liquidus viscosity may be greater than 25 Poises, greater than 50 Poises, or greater than 75 Poises. The main components used to form these compositions can include: $SiO_2$; $B_2O_3$; Alkali and Alkaline earth oxides including, for example $Al_2O_3$, $Li_2O$, $Na_2O$, CaO, BaO, SrO; and high index components: ZnO, $ZrO_2$, $TiO_2$, $La_2O_3$, $Nb_2O_5$. The glass compositions disclosed herein may be free of components that are suspected to be harmful to human health and/or or environment. Specifically, in some aspects, the glass compositions herein may be designed to be free of Arsenic (As), Lead (Pb), Cadmium (Cd), Mercury (Hg), Chromium (Cr), Thallium (Tl), or Vanadium (V). In other aspects, no refining agents need be added to obtain bubble free glass.

In some aspects, the glass composition may include: 25-30 wt % $SiO_2$; 2.5-6 wt % $B_2O_3$; 0-10 wt % $Li_2O$; 15-20 wt % CaO; 0-10 wt % BaO; 10-25 wt % $La_2O_3$; 2-10 wt % $ZrO_2$; 5-20 wt % $Nb_2O_5$; and 2-10 wt % $TiO_2$; where 40-55 wt % is the sum of BaO, $La_2O_3$, $ZrO_2$, $Nb_2O_5$, and $TiO_2$. In other aspects, the glass composition may also include: about 28 wt % $SiO_2$; about 3 wt % $B_2O_3$; about 16 wt % CaO; about 8 wt % BaO; about 16 wt % $La_2O_3$; about 3 wt % $ZrO_2$; about 18 wt % $Nb_2O_5$; and about 8 wt % $TiO_2$; where the wt % sum of the BaO, $La_2O_3$, $ZrO_2$, $Nb_2O_5$, and $TiO_2$ is about 53 wt %.

The disclosed glass compositions herein can provide several improved properties including devitrification resistance (kinetics) as measured by the critical cooling rate ($Q_c$). The critical cooling rate for a glass is kinetically driven and provides how fast the respective amorphous molten glass composition needs to be cooled to avoid crystallization. For example, a critical constant cooling rate of 55° C./min for a glass means the corresponding molten glass must be cooled at a rate of at least 55° C./min in order to prevent crystallization of the glass. Crystallization in glass can lead to non-uniform optical properties or even visible defects. Cooling molten glass at even and rapid rates across the sample (e.g., 50° C./min or faster) can be expensive and/or problematic for processing. On the contrary, a glass having a critical cooling rate of 5° C./min means the respective molten glass need only be cooled at 5° C./min in order to prevent crystallization. In such an example, cooling the sample faster than the critical cooling rate of 5° C./min would not lead to deleterious effects such as crystallization thus potentially offering manufacturers more flexibility in preparing glass samples having consistent and evenly dispersed optical properties. For example, glass compositions having a low critical cooling rate may be used to form thin objects such as sheets or tubes with different glass forming techniques (e.g., casting, pressing, rolling, drawing, etc. . . . ). In some aspects, the glass compositions may have a critical cooling rate less than about 30° C./min, less than about 25° C./min, less than about 20° C./min, less than about 17.5° C./min, less than about 15° C./min, less than about 12.5° C./min, less than about 10° C./min, less than about 7.5° C./min, less than about 5° C./min, or less than about 2.5° C./min. In some aspects, the glass compositions may have a critical cooling rate of about 30° C./min, of about 25° C./min, of about 20° C./min, of about 17.5° C./min, of about 15° C./min, of about 12.5° C./min, of about 10° C./min, of about 7.5° C./min, of about 5° C./min, or of about 2.5° C./min. In some aspects, the glass compositions may have a critical cooling rate from about 1° C./min to about 50° C./min, from about 1° C./min to about 45° C./min, from about 1° C./min to about 40° C./min, from about 1° C./min to about 35° C./min, from about 1° C./min to about 30° C./min, from about 1° C./min to about 25° C./min, from about 1° C./min to about 20° C./min, from about 1° C./min to about 15° C./min, from about 1° C./min to about 10° C./min, or from about 1° C./min to about 5° C./min.

Traditionally, the liquidus viscosity ($\eta_{liq}$)(P) of a glass sample was provided to describe the processability of the glass. The liquidus viscosity of a glass is a thermodynamically driven property where crystals begin to form at a given viscosity of the glass. Comparing liquidus viscosity values for different molten glass samples would be informative for manufactures to appreciate how viscous or liquid the sample would need to be before it started forming crystals. As discussed above for the critical cooling rate, crystallization formed as glass is cooling can lead to non-uniform optical properties or visible defects. The higher a liquidus viscosity value is, the more viscous the glass must be to start forming crystalline defects in the lattice. Although glass manufacturers have traditionally considered liquidus viscosity in their processing considerations, both the critical cooling rate and liquidus viscosity should be monitored to match processing conditions with the desired application. In some aspects, the glass compositions may have a liquidus viscosity greater than 15, greater than 25, greater than 50, greater than 75, greater than 100, greater than 125, greater than 150, greater than 175, or greater than 200. In some aspects, the glass compositions may have a liquidus viscosity of about 15, of about 25, of about 50, of about 75, of about 100, of about 125, of about 150, of about 175, or of about 200.

Forming processes (e.g., drawing, thin rolling) used to fabricate large structures (e.g., diameters greater than 150 mm) and/or smaller structures (e.g., glass wafers having a thickness less than 0.5 mm) with glasses having a refractive index greater than 1.75 requires very liquid glass (forming viscosity<50 poises) in order to achieve the desired shape ratio. The glass liquidus viscosity, although important to consider, is not the limiting factor in the formation of the respective structures but rather the devitrification kinetics manifested as crystal growth which controls the time available to form the glass before running into devitrification problems. As noted above, the consideration and balancing of both the critical cooling rate and liquidus viscosity will determine the parameters required to form a given structure.

The KA of a glass is related to the dynamic thermal stability of glass or the resistance to devitrification during heating or cooling where KA defines the difference (A) of the glass transition temperature (Tg) and the temperature onset of the first crystallization peak as measured by DSC. KA, as measured by DSC, depends on particle size distribution and heating rate. In various aspects of the present disclosure, the particle size for KA measurements may be at least about 15 μm, at least about 20 μm, at least about 25 μm, at least about 30 μm, at least about 35 μm, at least about 40 μm, at least about 45 μm, and/or combinations or ranges thereof. In some aspects of the present disclosure, the heating rate may be at least about 5° C., at least about 10° C., at least about 15° C., at least about 20° C., and/or combinations or ranges thereof. The higher the KA temperature, the more resistant the glass is to devitrification or crystallization. In some aspects, the KA is greater than about 175° C., greater than about 180° C., greater than about 185° C., greater than about 190° C., greater than about 195° C., greater than about 200° C., or greater than about 205° C. In other aspects, the KA is about 175° C., about 180° C., about 185° C., about 190° C., about 195° C., about 200° C., or about 205° C. The measurement of both the KA and $Q_c$ values are not governed by standardized techniques but are defined in the Example section.

In some aspects, the refractive index for the various glass embodiments disclosed herein can be in the range from about 1.74 to about 1.80 and have a visible total transmittance ($T_{vis}$) greater than about 80% at a 10 mm optical path. In some aspects, the refractive index of the glass may be greater than about 1.74, greater than about 1.75, greater than about 1.76, greater than about 1.77, greater than about 1.78, greater than about 1.79, or greater than about 1.80. In other aspects, the refractive index can be about 1.74, about 1.75, about 1.76, about 1.77, about 1.78, about 1.79, or about 1.80. In some aspects, the visible total transmittance ($T_{vis}$) of the glass may be about 80% at a 10 mm optical path, about 82.5% at a 10 mm optical path, about 85% at a 10 mm optical path, about 87.5% at a 10 mm optical path, or about 90% at a 10 mm optical path.

In some aspects, the density of the various glass embodiments disclosed herein can range from about 3.25 g/cm$^3$ to about 4.0 g/cm$^3$, from about 3.4 g/cm$^3$ to about 3.8 g/cm$^3$, from about 3.5 g/cm$^3$ to about 3.75 g/cm$^3$, or from about 3.6 g/cm$^3$ to about 3.7 g/cm$^3$. In some aspects, the glass density can be about 3.25 g/cm$^3$, about 3.30 g/cm$^3$, about 3.35 g/cm$^3$, about 3.40 g/cm$^3$, about 3.45 g/cm$^3$, about 3.50 g/cm$^3$, about 3.55 g/cm$^3$, about 3.60 g/cm$^3$, about 3.65 g/cm$^3$, about 3.70 g/cm$^3$, or about 3.75 g/cm$^3$.

In some aspects, the Abbe number of the various glass embodiments disclosed herein have an Abbe number (v), less than about 50, less than about 45, less than about 40, less than about 35, less than about 30, or less than about 25.

Referring now to FIG. 1 a differential scanning calorimetry (DSC) plot of Example 1, described below, taken at a 10° C./min heating rate according to some aspects of the present disclosure is provided. A first endotherm was observed at 615° C. indicating a glass transition temperature followed by a large exothermic peak that corresponds to a glass crystallization event. The large exothermic peak associated with the glass crystallization event is the tallest and sharpest peak in the DSC plot. The large exothermic peak associated with the glass crystallization event is also the most energetic event logged by the DSC plot. The peak onset of the glass crystallization event is noted at 808° C. The KA value, defined as the A of the glass transition temperature (Tg) and the onset temperature of the first crystallization peak is 808° C.−615° C.=193° C. A complex peak endo peak was observed at about 980° C. The complex endothermic peak is induced by crystal melting events of crystals that were formed earlier.

Figure 2:
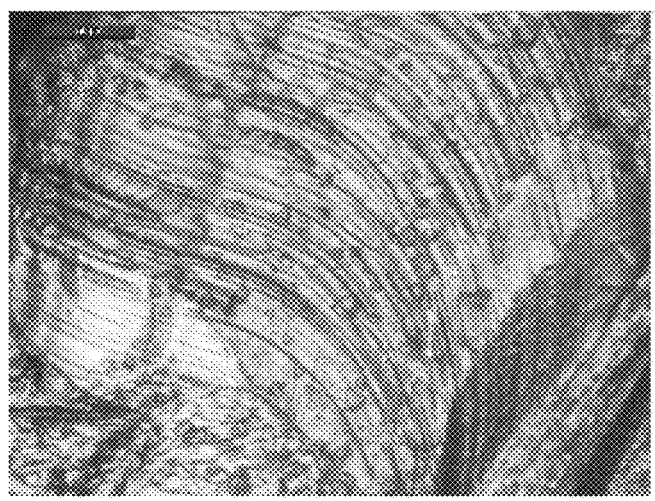
FIG. 2 is a photo of an Example 4 glass cooled at 5° C./min from 1150° C. to 600° C. according to some aspects of the present disclosure.
Figure 3:
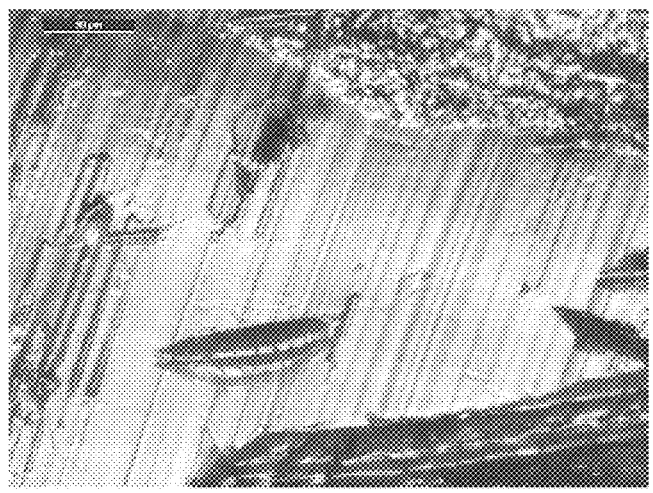
FIG. 3 is a photo of an Example 4 glass cooled at 10° C./min from 1150° C. to 600° C. according to some aspects of the present disclosure.
Figure 4:
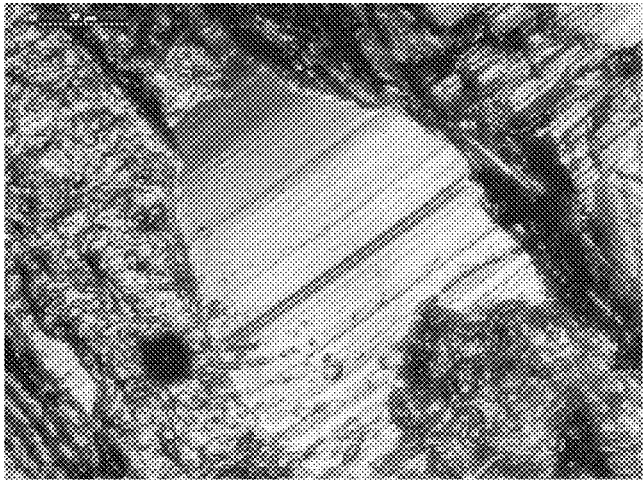
FIG. 4 is a photo of an Example 4 glass cooled at 30° C./min from 1150° C. to 600° C. according to some aspects of the present disclosure.

Referring now to FIGS. 2, 3 and 4, several photos are provided corresponding to an Example 4 composition detailed below where the glass is cooled from 1150° C. to 600° C. at 5° C./min, 10° C./min, and 30° C./min rates. The FIG. 2 photo depicts crystals formed throughout the glass patty, in particular scattered through the striated center portion. The FIGS. 3 and 4 photos demonstrate and show that no crystals were formed upon cooling at the 10° C./min, and 30° C./min rates. Accordingly, the critical cooling rate ($Q_c$) is between 10° C./min and 10° C./min for the Example 4 glass.

EXAMPLES

Materials

The glass compositions disclosed herein were formed using commercially available materials and the respective components were used as received.

Differential Scanning Calorimetry (DSC) Measurements

The onset of the glass transition temperature ($T_g$) and melt transition temperature ($T_x$) for a glass sample were determined using a differential scanning calorimeter (PYRIS PERKIN ELMER) with a heating rate of 10° C./min. The glass specimens were measured as a glass powder with controlled particle size distribution (25-38 μm). Approximately 30 mg of glass powder was used for each measurement.

Density Measurements

The density of the respective glass samples were measured using a Helium Pycnometer Accupy 1330 Micromeritic.

Transmission (T %) Measurements

The glass transmission was measured on a polished glass sample (2.0 mm) using a UV-VIS-NIR spectro-photometer CARY 500 scan including a labsphere DRA-CA-5500 for collecting the diffused light. The transmittance % was measured at one nanometer intervals from 380 mm to 800 nm.

High Temperature Viscosity Measurements

The glass melt viscosity was measured using a Rotating Spindle Viscometer according to ASTM C-965 Procedure A. The technique uses a constant angular velocity method to measure viscosities at specific temperatures in order to generate the viscosity/temperature curve of a molten glass

Liquidus Temperature Measurements

The liquidus temperature was measured using a small piece of glass into a small platinum cup. The glass was then heat treated for 17 hours at a given temperature and then air quenched to room temperature. An optical microscope having a magnification (×1,000-4,000) was used to detect the presence of crystals at the glass/air side and platinum/glass side of the glass sample. Liquidus temperature was confirmed when crystals were observed to be formed relative to the treatment temperature.

Refractive Index and Abbe Number Measurements

The index of refraction and Abbe number measurements were performed at a laser wavelength of 587 nm using the Metricon Model 2010 Prism Coupler. The refractometer measured the refractive index of a material using the critical angle of reflection. If a material with an index of n was coupled to a prism using an index np, laser light directed onto the base of the prism would be totally reflected until the angle of incidence becomes less than the critical angle ($\theta_c$). The Equation for $\theta_c$ is "$\theta_c = \arcsin(n/n_p)$."

Critical Cooling Rate Measurements $Q_c$, or $R_c$, is defined as the critical cooling rate and is the value of the constant cooling rate threshold of the glass melt for which devitrification occurs during constant cooling. Critical cooling rates are often determined from TTT diagrams (see below), where glass is heated isothermally at a given temperature and volume percent (vol %) of crystals is determined as a function of time. A line is plotted that depicts an example of temperature vs. time conditions where the crystal volume percent is 0.1. Here, a non-isothermal method was employed. In this test, a given volume (1.0 cc) of glass is placed inside a platinum dish. The glass is then pre-heated in an electrical furnace at $T_{Liq}+50°$ C. for 30 minutes followed by cooling at a constant cooling rate (i.e., 60° C./min) down to room temperature (with thermocouple touching the glass for accuracy). Finally, the glass is then examined under an optical microscope (×1,000) to check if crystals are confirmed at the glass/platinum interface side.

Examples 1-5

Examples 1-5 were prepared by mixing 1000 g (total weight) of the raw materials (i.e., quartz, boric acid, calcium carbonate, niobium oxide etc. . . . ) into a pure platinum crucible and introducing the loaded crucible into a globar furnace preheated at 1350° C. The furnace was then ramped up to a temperature of 1500° C. and held at this temperature for four hours. The respective melts were then poured onto a cooled stainless steel table and rolled into a 6 mm thick sheet patty. The corresponding sheet patties were then annealed at 650° C. The individual components used to produce Examples 1-6 are provided below in Table 1:

TABLE 1

| Components in wt % | Ex. 1 | Ex. 2 | Ex. 3 | Ex. 4 | Ex. 5 | Ex. 6 |
|---|---|---|---|---|---|---|
| $SiO_2$ | 28.5 | 38.5 | 35.4 | 27.9 | 27.4 | 28.0 |
| $B_2O_3$ | 2.0 | 2.7 | 2.5 | 4.0 | 5.9 | 3.0 |
| $Li_2O$ | 4.0 | 5.4 | 5.0 | 3.9 | 3.8 | — |
| CaO | 15.2 | 17.8 | 17.0 | 14.9 | 14.6 | 16.3 |
| BaO | — | — | — | — | — | 7.9 |
| $La_2O_3$ | 20.8 | 12.5 | 15.1 | 20.4 | 20.0 | 16.0 |
| $ZrO_2$ | 5.5 | 7.5 | 6.9 | 5.4 | 5.3 | 3.0 |
| $Nb_2O_5$ | 15.1 | 7.6 | 10.0 | 14.8 | 14.5 | 17.7 |
| $TiO_2$ | 8.8 | 8.0 | 8.3 | 8.6 | 8.4 | 8.1 |
| $\Sigma BaO + La_2O_3 + ZrO_2 + Nb_2O_5 + TiO_2$ | 50.3 | 35.6 | 40.2 | 49.2 | 48.3 | 52.7 |

The refractive index, Abbe number, density, glass transition temperature ($T_g$), $T_x$ exo peak onset, KA, liquidus, $Q_c$, liquidus viscosity (P), and transmittance at 10 mm are provided for Examples 1-6 in Table 2 below:

TABLE 2

| Property | Ex. 1 | Ex. 2 | Ex. 3 | Ex. 4 | Ex. 5 | Ex. 6 |
|---|---|---|---|---|---|---|
| n(d) (587 nm) | 1.800 | 1.744 | 1.757 | 1.804 | 1.797 | 1.803 |
| Abbe number | 34.6 | 38.3 | 36.5 | 42.7 | 34.3 | — |
| density, g/cm³ | 3.649 | 3.272 | 3.380 | 3.611 | 3.584 | 3.752 |
| Tg, ° C. | 615 | 591 | 599 | 604 | 596 | 720 |
| Tx onset, ° C. | 808 | 792 | 803 | 779 | 782 | 888 |
| KA, ° C. | 193 | 201 | 204 | 175 | 186 | 168 |
| Liquidus, ° C. | 1090-1110 | 1093-1120 | 1093-1120 | 1064-1087 | 1064-1077 | 1100-1120 |
| Qc, ° C./min | >55 | — | — | 5-10 | 5-10 | 1-5 |
| Liquidus viscosity (P) | 15 | 19-30 | 23-38 | — | 18-23 | 100-150 |
| T (10 mm), % | 84.6 | 86.4 | 85.7 | 84.7 | 84.8 | 83.5 |

Increasing the boron content and/or decreasing the lithium content (see Ex. 1 vs. Ex. 4, Ex. 1 vs. Ex. 5, and Ex. 1 vs. Ex. 6) was shown to not significantly decrease the liquidus temperature but rather improves the critical cooling rate $Q_c$ to 1° C./min<$Q_c$<5° C./min versus the $Q_c$>55° C./min measured for the Example 1 glass. The substitution of lithium with barium in Example 6 demonstrated a significant increase in the liquidus viscosity and $Q_c$. In addition, the specific refraction of Example 6 is inferior to Example 1 since the Example 6 glass is shown to be more resistant to devitrification than Example 1 due to the higher liquidus viscosity and lower $Q_c$. It is also noted that as the ΣBaO+ $La_2O_3+ZrO_2+Nb_2O_5+TiO_2$ content increases, the refractive index and the density also increases.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:
1. A glass composition, comprising:
   38.5-40 wt % $SiO_2$;
   0-10 wt % $B_2O_3$;
   0-10 wt % $Al_2O_3$;
   0-15 wt % $Li_2O$;
   10-25 wt % CaO;
   0-15 wt % BaO;
   0-5 wt % MgO;
   0-5 wt % SrO;
   0-7 wt % ZnO;
   2-10 wt % ZrO;
   215 wt % $TiO_2$;
   5-25 wt % $Nb_2O_5$;
   0-5 wt % $Ta_2O_5$;
   5-25 wt % $La_2O_3$; and
   0-5 wt % $Y_2O_3$,
   wherein the glass has a refractive index from 1.74 to 1.80, a density from 3.5 g/cm³ to 4.0 g/cm³, a critical cooling rate from 1° C./min to 50° C./min, and a liquidus viscosity greater than 25 Poises.

2. The glass composition of claim 1, wherein the $Li_2O$, $Na_2O$, and $K_2O$ content is from 0 wt % to 16 wt %.

3. The glass composition of claim 1, wherein the CaO, BaO, MgO, and SrO content is from 10 wt % to 30 wt %.

4. The glass composition of claim 1, wherein the glass does not include any of Arsenic (As), Lead (Pb), Cadmium (Cd), Mercury (Hg), Chromium (Cr), Thallium (Tl), or Vanadium (V).

5. The glass composition of claim 1, wherein the glass has a transmission at 385 nm from 80% to 90%.

6. The glass composition of claim 1, wherein the critical cooling rate is from 1° C./min to 25° C./min.

7. The glass composition of claim 1, wherein the critical cooling rate is from 1° C./min to 10° C./min.

8. The glass composition of claim 1, wherein the critical cooling rate is from 1° C./min to 5° C./min.

9. A glass composition comprising:
   38.5-40 wt % $SiO_2$;
   2.5-6 wt % $B_2O_3$;
   0-10 wt % $Li_2O$;
   15-20 wt % CaO;
   0-10 wt % BaO;
   10-25 wt % $La_2O_3$;
   2-10 wt % $ZrO_2$;
   5-20 wt % $Nb_2O_5$; and
   2-10 wt % $TiO_2$,
   wherein the glass composition has a critical cooling rate from 1° C./min to 50° C./min and a liquidus viscosity greater than 25 Poises.

10. The glass composition of claim 9, wherein the BaO, $La_2O_3$, $ZrO_2$, $Nb_2O_5$, and $TiO_2$ content is from 40 wt % to 55 wt %.

11. The glass composition of claim 9, wherein the glass composition comprises 38.5 wt % $SiO_2$; 2.7 wt % $B_2O_3$; 17.8 wt % CaO; 12.5 wt % $La_2O_3$; 5.5 wt % $ZrO_2$; 7.6 wt % $Nb_2O_5$; and 8.8 wt % $TiO_2$.

12. The glass composition of claim 9, wherein the glass has a transmission at 385 nm from 80% to 90%.

13. The glass composition of claim 9, wherein the glass composition has a refractive index from 1.74 to 1.80 and a density from 3.5 g/cm³ to 4.0 g/cm³.

14. The glass composition of claim 9, wherein the critical cooling rate is from 1° C./min to 5° C./min.

\* \* \* \* \*

UNITED STATES PATENT AND TRADEMARK OFFICE
CERTIFICATE OF CORRECTION

PATENT NO. : 11,591,253 B2
APPLICATION NO. : 16/676923
DATED : February 28, 2023
INVENTOR(S) : Paulo Jorge Gaspar Marques It is certified that error appears in the above-identified patent and that said Letters Patent is hereby corrected as shown below:

On the Title Page

In item (56), in Column 2, under "Other Publications", Line 1, delete "Writien" and insert -- Written --.

In the Claims

In Column 10, Line 21, in Claim 1, delete "0-" and insert -- 2.5- --.

In Column 10, Line 30, in Claim 1, delete "215" and insert -- 2-15 --.

Signed and Sealed this
Twenty-second Day of August, 2023

Katherine Kelly Vidal
*Director of the United States Patent and Trademark Office*